United States Patent [19]

Takanori

[11] Patent Number: 4,684,234

[45] Date of Patent: Aug. 4, 1987

[54] STROBO CONTROL CIRCUIT

[75] Inventor: Kohno Takanori, Tokyo, Japan

[73] Assignee: Copal Company Limited, Tokyo, Japan

[21] Appl. No.: 888,472

[22] Filed: Jul. 21, 1986

[30] Foreign Application Priority Data

Jul. 27, 1985 [JP] Japan ................... 60-166610

[51] Int. Cl.⁴ ................... G03B 15/05; G03B 7/16
[52] U.S. Cl. ................... 354/421; 354/137
[58] Field of Search ........... 354/421, 422, 435–440, 354/458, 137

[56] References Cited

U.S. PATENT DOCUMENTS

| 3,832,723 | 8/1974 | Nickel | 354/458 |
| 4,065,776 | 12/1977 | Iwata et al. | 354/422 |
| 4,192,587 | 3/1980 | LaRocque et al. | 354/421 X |
| 4,603,954 | 8/1986 | Egawa et al. | 354/137 |

FOREIGN PATENT DOCUMENTS 2163268A 2/1986 United Kingdom ............... 354/435

Primary Examiner—W. B. Perkey
Attorney, Agent, or Firm—Wenderoth, Lind & Ponack

[57] ABSTRACT

A strobo control circuit includes shutter blades having the function of the diaphragm and which are opened so that an opening area thereof is substantially proportional to the square of exposure time. A distance to a subject to be photographed is detected by, for exmaple, a distance measuring circuit or a focus adjusting mechanism and a basic pulse having a period which is substantially proportional to the distance is generated. The basic pulse is supplied to a counter in interlocked relationship with the opening operation of the shutter blades so that the counter is operated. A coded film speed is inputted and when a count of the counter reaches a value determined in accordance with the coded film speed, a strobo unit is lighted so that an F number upon the flashlight illumination of the strobo unit corresponds to the film speed and the distance.

7 Claims, 9 Drawing Figures

STROBO CONTROL CIRCUIT

BACKGROUND OF THE INVENTION

The present invention relates to a strobo control circuit which controls an illumination timing of a strobo unit contained in a still camera with a programming shutter employing shutter blades having the function of the diaphragm, and more particularly to a strobo control circuit suitable for the still camera adapted to be supplied with film speed information in the form of a CAS (abbreviation of Camera Autosensing System) code expressed by an insulated pattern formed on a conductive membrane on a cartridge.

As well-known, since the intensity of illumination by the strobo unit is inversely propotional to the square of the distance to a subject to be photographed and the F number of a photographing lens is a geometric series of $2\frac{1}{2}$, the guide number GN which is an index representing an amount of illumination of the strobo unit is defined by a product of the distance and the F number in the case of the film speed of ISO 100. When a strobo unit having a fixed guide number GN is employed, the strobo unit is lighted at a time when an F number determined in accordance with the film speed and the distance is obtained so that a proper exposure can be obtained.

Since the programming shutter employing the shutter blades having the function of diaphragm possesses the F number which varies during the exposure with the lapse of time, the following methods are adopted generally in order to obtain a proper exposure in the photographing operation using the strobo unit.

(1) An operating range of an opening mechanism for the shutter blades is limited by a mechanism interlocked with both a film speed dial and a focus adjusting mechanism so that the fully opened position of the shutter blades is mechanically limited to determine an F number upon the flashlight illumination of the strobo unit.

(2) An analog operation is performed on the basis of a voltage interlocked with the film speed dial and a voltage interlocked with the focus adjusting mechanism to calculate a timing that the opening position of the shutter blades corresponds to a proper F number and the strobo unit is lighted at that timing.

In the method described in the above item (1), however, since there is provided with the mechanism for limiting the operating range of the opening mechanism for the shutter blades in addition to the mechanism for opening and closing the shutter, it is pointed out that the shutter mechanism is more complicated and it is very difficult to introduce such a method into a camera which does not contain the film speed dial such as a camera for a CAS film.

If the method described in the above item (2) is applied to the camera supplied with the coded film speed such as the camera for the CAS film, the digital-to-analog conversion is required and it is very difficult to eliminate the conversion error and the operation error since a dynamic range of $2^6$ is required in the case where the film speed range of a used film assumes ISO25 to ISO1600, for example,

SUMMARY OF THE INVENTION

The present invention has been made in order to solve the above problems, and an object of the present invention is to provide a novel strobo control circuit having no room for occurrence of the conversion error and the operation error by determining a timing that a strobo unit is lighted without increase of a mechanical member for limiting an operating range of an opening mechanism for shutter blades and without performing digital-to-analog conversion and operation process.

The strobo control circuit of the present invention is based on a timing forecasting type strobo control circuit in which a timing that the F number of the shutter blades having the function of diaphragm will be a proper value determined in accordance with an amount of illumination of the strobo unit, a distance to a subject being photographed and a film speed is estimated and a trigger for the flashlight illumination is applied to the strobo unit. In order to achieve the above object, the strobo control circuit of the present invention comprises basic pulse generating means for generating a basic pulse having a period determined in accordance with the distance, a counter which starts counting operation thereof by the basic pulse in interlocked relationship with opening operation of the shutter blades, a film speed input circuit for inputting a digital code of a film speed and trigger signal producing means for supplying a trigger signal for flashlight illumination to the strobo unit at a time the counter counts the basic pulse by the number of times corresponding to the digitally inputted film speed.

More particularly, in the strobo control circuit of the present invention, when the count of the counter reaches a value corresponding to the film speed, the strobo unit is lighted so that the flim speed is reflected to the F number at the time the strobo unit is lighted. Furthermore, the period of the basic pulse for operating the counter is proportional to the distance to the subject being photographed so that the distance is reflected to the F number at the time the strobo unit is lighted. Thus, the F number at the time the strobo unit is lighted is accorded with the distance and the film speed.

Since, in the present invention, the coded film speed information is employed as it is digital information, there is no room for occurrence of conversion error. Further, since the distance factor is determined by performance of a focus adjusting mechanism within a range where the flashlight can reach and the dynamic range is less than ten times, error in the distance-to-time conversion can be reduced.

DESCRIPTION OF THE PREFERRED EMBODIMENTS

An embodiment of the present invention is now described in detail with reference to the drawings.

Figure 1:
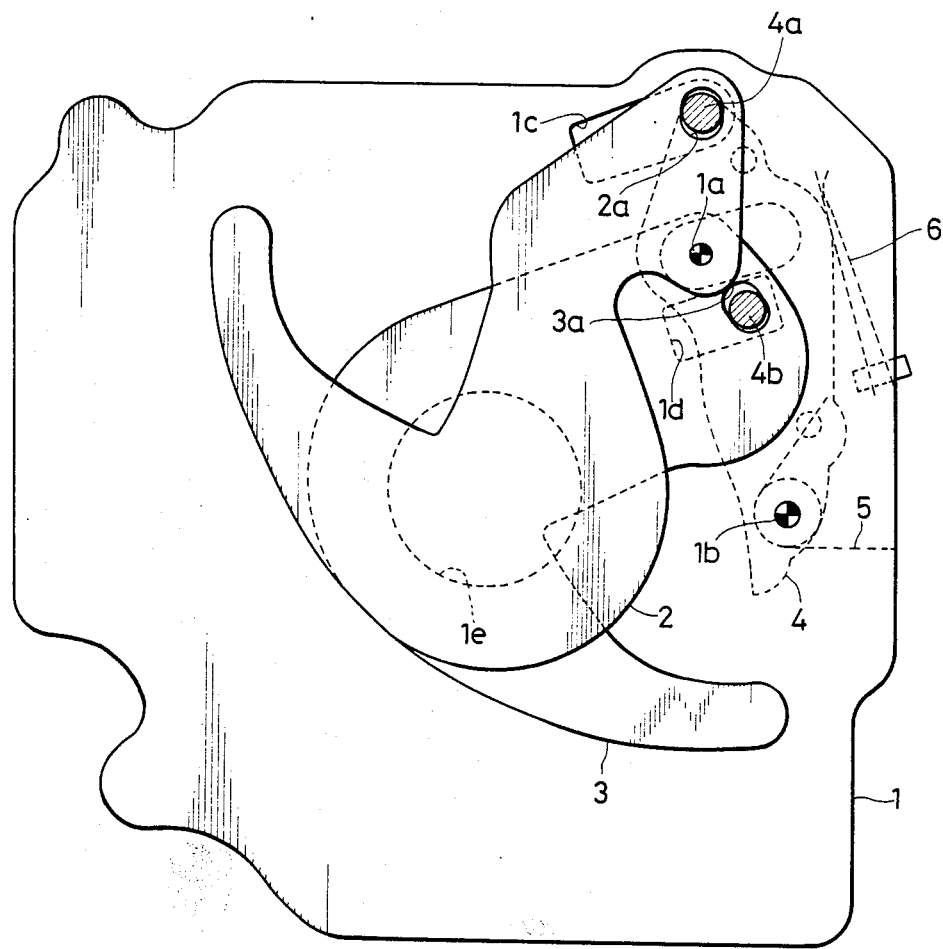
FIG. 1 is a plan view of a shutter mechanism.

FIG. 1 schematically illustrates only an opening and closing mechanism for shutter blades having the function of the diaphragm in a programming shutter mechanism, in which numeral 1 denotes a base plate for the shutter, numeral 2 and 3 denote shutter blades having the function of the diaphragm, and numeral 4 denotes a lever for opening and closing the shutter blades.

The shutter blades 2 and 3 are supported by an axis 1$a$ on the base plate 1 swingably along the front surface of the base plate 1. The lever 4 is supported by an axis 1$b$ on the base plate 1 swingably along the rear surface of the base plate 1.

The shutter blade 2 is formed with an elongated hole 2$a$ into which a boss 4$a$ provided at an end of the lever 4 is fitted through an elongated hole 1$c$ formed in the base plate 1.

In the same manner, the shutter blade 3 is formed with an elongated hole 3$a$ into which a boss 4$b$ provided at the center of the lever 4 is fitted through the elongated hole 1$d$ formed in the base plate 1.

The lever 4 is urged to rotate counter-clockwise by a spring 5, while in the shutter set condition, that is, in the shutter closed condition illustrated in FIG. 1 the lever 4 is engaged with an engagement member not shown to prevent its counter-clockwise rotation.

When the engagement of the lever 4 is released in interlocked relationship with a stroke of a shutter button not shown, the lever 4 is rotated counter-clockwise by the spring 5 so that the counter-clockwise rotation of the lever 4 rotates the shutter blade 2 counter-clockwise about the axis 1$a$ through the boss 4$a$ and at the same time rotates the shutter blade 3 clockwise about the axis 1$a$ through the boss 4$b$.

Accordingly, an aperture 1$e$ is opened by the shutter blades 2 and 3 and the diameter of the aperture is gradually increased.

When the exposure is terminated, the lever 4 is returned to its initial position by the opposite movement to the opening of the aperture to return the shutter blades 2 and 3 to the initial position thereof.

Numeral 6 denotes a trigger switch of a normally closed type which is fixedly mounted to the rear side of the base plate 1 to be opened and closed by the lever 4 and which is opened when the lever 4 is rotated counter-clockwise. The detail of the trigger switch 6 is described later.

Figure 2:
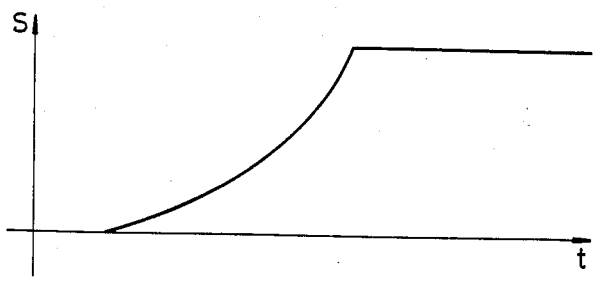
FIG. 2 is an opening characteristic diagram of shutter blades having the function of diaphragm shown in FIG. 1.

FIG. 2 is an opening characteristic diagram of the programming shutter employing such shutter blades having the function of the diaphragm, in which the axis of abscissa indicates the opening time t and the axis of ordinate indicates the opening area S of the aperture 1$e$.

Although not shown in FIG. 1, the counter-clockwise rotation of the lever 4 in the programming shutter of this type is effected at a constant speed by a governor as well known and hence the shutter blades 2 and 3 are opened so that the opening aperture thereof is substantially proportional to the opening time t. Accordingly, as shown in FIG. 2, the opening area S is the function of the square of the opening time t and after the aperture is fully opened the opening area is constant irrespective of the opening time t.

The operating range after the aperture 1$e$ has been opened fully is outside the range that the illumination of the strobo unit can be controlled. The strobo control circuit of the present invention is to ensure the accuracy of exposure only in the so-called triangular opening area before the aperture is fully opened.

Since the F number of the photographing lens is defined by a ratio of the effective aperture of the lens and the focal distance as well known, when the aperture is opened so that the effective aperture is proportional to the opening time t, the F number is inversely proportional to the opening time t and the following equation is given.

$$t = K_1/F \tag{1}$$

where $K_1$ is a proportional constant.

On the other hand, the general equation of the strobo unit is given by the following equation (2).

$$F = GN \cdot (\text{ISO Film Speed}/\text{ISO}100)^{\frac{1}{2}}/L \tag{2}$$

where GN is a guide number and L is a distance to the subject to be photographed.

Accordingly, if the equation (1) is rewritten by using the equation (2) and the guide number GN is a constant, the relation between the opening time t until the strobo unit is lighted after start of the opening, the film speed and the distance is given by the following equation (3).

$$t = K_2 \cdot L/(\text{ISO Film Speed}/\text{ISO}100)^{\frac{1}{2}} \tag{3}$$

where $K_2$ is a constant.

Accordingly, the following relation is effected among the opening time t until the strobo unit is lighted after start of the opening, the distance L and the film speed.

(a) The opening time t is inversely proportional to the square root of a ratio of the ISO film speed to ISO 100 and the opening time t is doubled each time the film speed reduces the 2Sv.

(b) The opening time t is proportional to the distance L and when the distance L is increased the opening time t is increased at the same rate as the increase of the distance.

Figure 3:
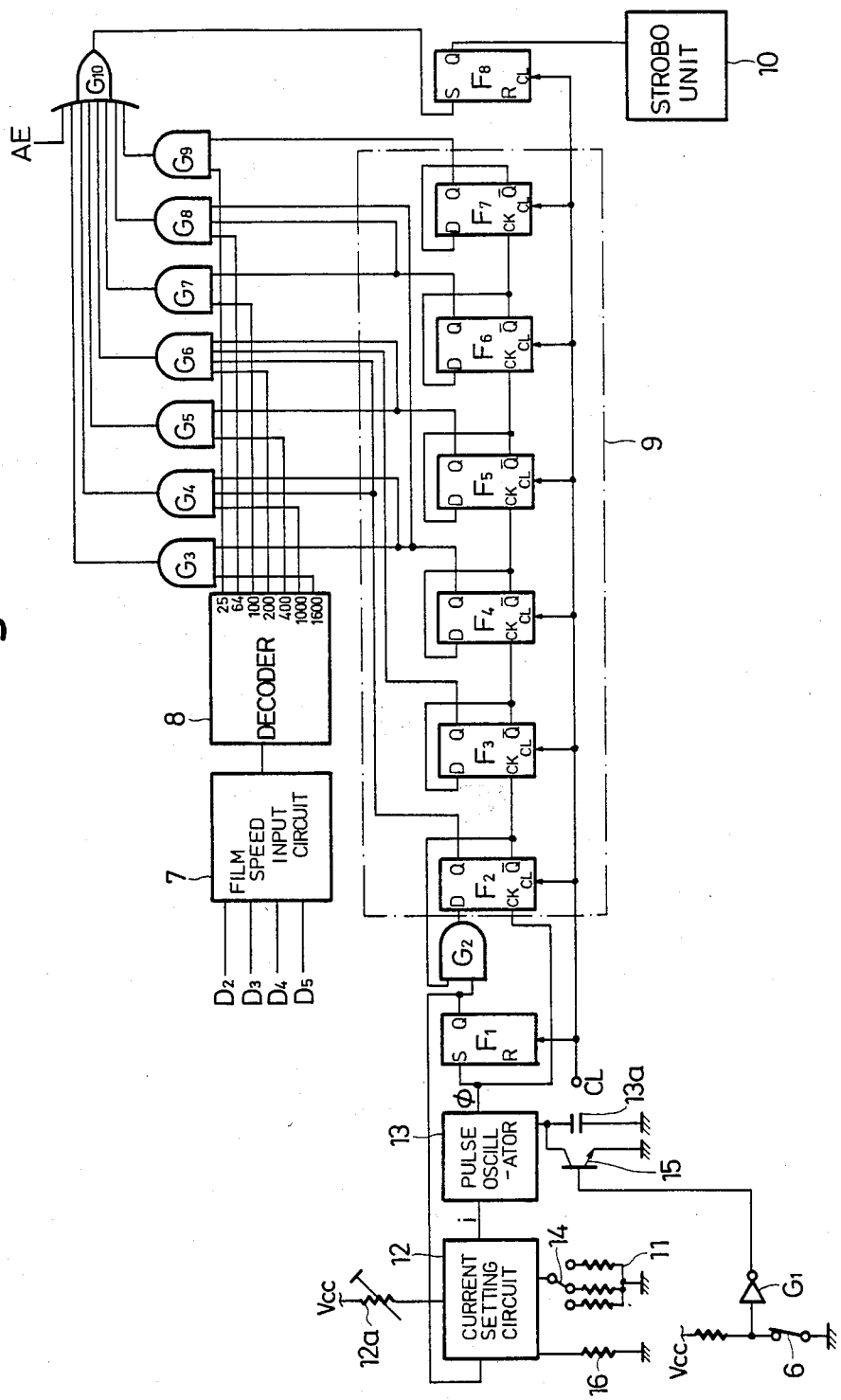
FIG. 3 is a circuit diagram showing an embodiment of the present invention.

Accordingly, when the programming shutter having the opening characteristic as shown in FIG. 2 is employed, if the control circuit is so configured that the above relation described in the items (a) and (b) is satisfied, the strobo unit is lighted at the time when a proper F number corresponding to the distance and the film speed is obtained. FIG. 3 shows an example of a circuit which operates in such a manner.

In FIG. 3, numeral 7 denotes a film speed input circuit which electrically read the CAS code formed on the film case such as a cartridge to input a film speed.

Description is now made to the CAS code. The CAS code is to represent various information by covering conductive films by insulation mask bit by bit, the conductive films being formed at predetermined positions on the cartridge and connected to ground.

The CAS code standardized at the present time includes 5-bit masks assigned for representing the film speed in addition to a common ground bit and can represent the film speed information of ISO 25 to ISO 5000 each $\frac{1}{3}$ EV. In the present embodiment, in order to simplify the overall circuit while suiting with many films commercially available, the above example of circuit is configured that the film for the film speed of 7 types containing ISO 25, 64, 100, 200, 400, 1000 and 1600 can be used.

Figure 4:
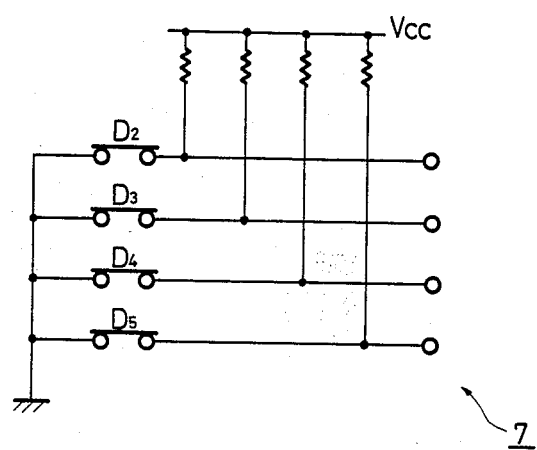
FIG. 4 is a circuit diagram showing an example of a film speed input circular shown in FIG. 3.

FIG. 4 shows an actual circuit of the film speed input circuit 7, in which $D_2$ to $D_5$ represent contacts which are brought into contact with the mask pattern for four bits of the second to fifth bit of the CAS code.

Accordingly, the contact $D_2$ to $D_5$ are electrically connected to common ground to be in the ground potential when the insulation mask is not formed on the corresponding contact positions, while the contact $D_2$ to $D_5$ are pulled up to Vcc level when the insulation mask is formed on the corresponding contact positions.

The output of the film speed input circuit 7 is supplied to a decoder 8 which decodes the output.

The decoder 8 of the present embodiment is a one-out-of-seven type decoder which applies a high level signal to one input of an AND gate $G_9$ when the film speed is ISO 25, to one input of an AND gate $G_8$ when the film speed is ISO 64, to one input of an AND gate $G_7$ when the film speed is ISO 100, to one input of an AND gate $G_6$ when the film speed is ISO 200, to one input of an AND gate $G_5$ when the film speed is ISO 400, to one input of an AND gate $G_4$ when the film speed is ISO 1000, and to one input of an AND gate $G_3$ when the film speed is ISO 1600. Outputs of the AND gates $G_3$ to $G_8$ are supplied to an S input of a flip-flop $F_8$ through an OR gate $G_{10}$.

$F_2$ to $F_7$ are D type flip-flops forming a counter 9.

In operation, since the $\overline{Q}$ output of the flip-flops $F_2$ to $F_7$ is supplied to the D input thereof, when a pulse is inputted to the clock input thereof, the Q output thereof are inverted by a rising edge of the pulse supplied to the clock input and hence a pulse having twice the period of the input pulse is generated from the output of the flip-flops.

Since the $\overline{Q}$ output of the flip-flops $F_2$ to $F_6$ is applied to the clock input of the next-stage flip-flops $F_3$ to $F_7$, the flip-flops $F_3$ to $F_7$ successively generate pulses having twice the period of pulses produced from the preceding flip-flops $F_2$ to $F_6$.

The Q outputs of the flip-flops $F_2$ to $F_7$ forming the counter 9 are properly applied to the other inputs of the AND gates $G_3$ to $G_9$ corresponding to the film speed of ISO 1600 to ISO 25 and the AND gates $G_3$ to $G_9$ produce outputs at timing corresponding to the film speed, respectively, to trigger the strobo unit.

The connection of the outputs of the flip-flops $F_2$–$F_7$ forming the counter 9 and the inputs of the AND gates $G_3$ to $G_9$ is now described.

Figure 5:
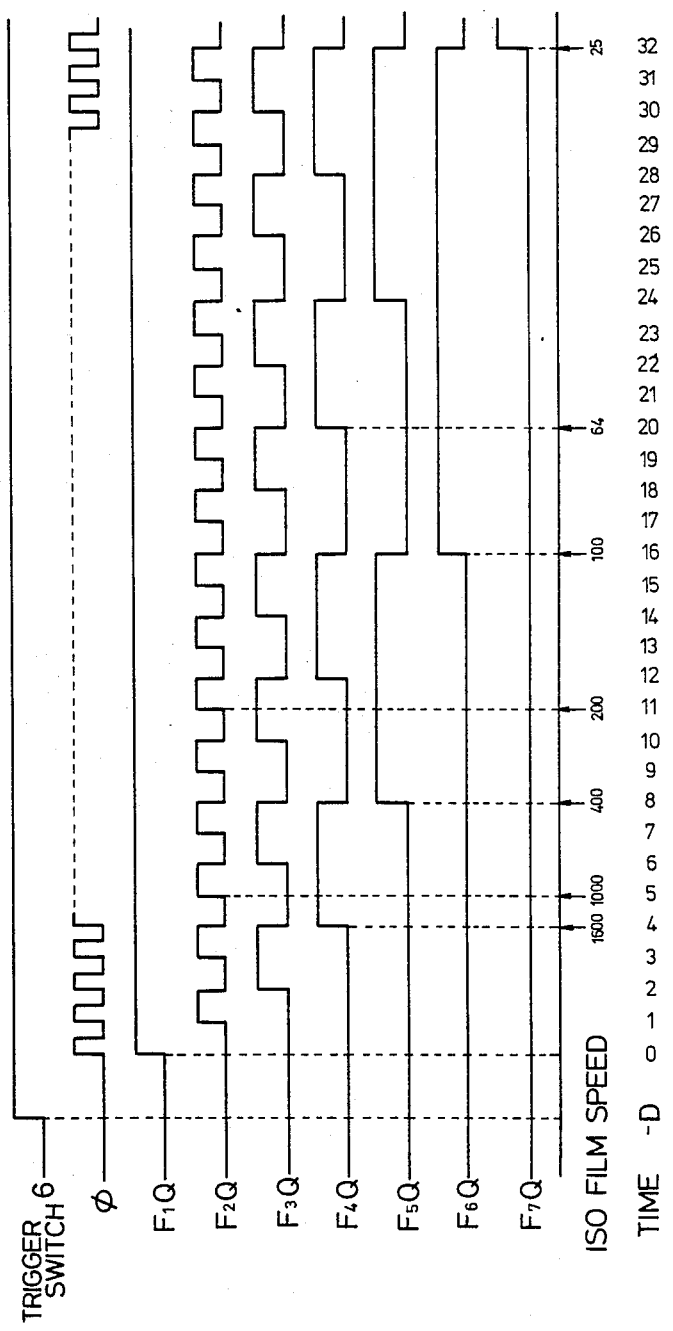
FIG. 5 is a timing chart of the circuit shown in FIG. 3.

FIG. 5 is a timing chart of the present embodiment. The clock input of the flip-flop $F_2$ is supplied with the basic pulse $\phi$ and the clock inputs of the flip-flops $F_3$ et seq. are supplied with the $\overline{Q}$ outputs of the preceding flip-flops. Accordingly, when the inversion period of the flip-flop $F_2$ is "1", the inversion period of flip-flop $F_3$ is "2", inversion period of flip-flop $F_4$ is "4", the inversion period of flip-flop $F_5$ is "8", the inversion period of flip-flop $F_6$ is "16" and the inversion period of flip-flop $F_7$ is "32".

The necessity of doubling the opening time t each time the film speed is reduced by 2Sv has been described already.

Accordingly, the present embodiment is configured as follows:

(1) The AND gate $G_3$ corresponding to ISO 1600 is supplied with the Q output of the flip-flop $F_4$ and the AND gate $G_3$ produces an output thereof when the count of the counter 9 reaches "4".

(2) The AND gate $G_5$ corresponding to ISO 400 is supplied with the Q output of the flip-flop $F_5$ and the AND gate $G_5$ produces an output thereof when the count of the counter 9 reaches "8".

(3) The AND gate $G_7$ corresponding to ISO 100 is supplied with the Q output of the flip-flop $F_6$ and the AND gate $G_7$ produces an output thereof when the count of the counter 9 reaches "16".

(4) The AND gate $G_9$ corresponding to ISO 25 is supplied with the Q output of the flip-flop $F_7$ and the AND gate $G_9$ produces an output thereof when the count of the counter 9 reaches "32".

Thus, the exact opening time ratio is set for each film speed step of 2Sv in the range of the film speed of ISO 1600 to ISO 25.

The AND gates which do not correspond to the film speed steps of 2Sv, that is, the AND gates $G_4$, $G_6$ and $G_8$ corresponding to the ISO 1000, 200 and 64, respectively, are further connected to the outputs of the flip-flops $F_2$ and $F_3$ having shorter invsersion periods than that of the flip-flop $F_4$ in combination so that approximate opening time ratios corresponding to the respective film speeds are set.

More particularly, in order to set the appoximate opening time ratios corresponding to the film speeds, the circuit of FIG. 3, is structured as follows.

(1) The outputs of the flip-flop $F_2$ and $F_4$ are applied to the AND gate $G_4$ corresponding to ISO 1000 and the AND gate $G_4$ produces an output thereof when the count of the counter 9 reaches "5".

(2) The outputs of the flip-flop $F_2$, $F_3$ and $F_4$ are applied to the AND gate $G_6$ corresponding to ISO 200 and the AND gate $G_6$ produces an output thereof when the count of the counter 9 reaches "11".

(3) The outputs of the flip-flop $F_4$ and $F_6$ are applied to the AND gate $G_8$ corresponding to ISO 64 and the AND gate $G_8$ produces an output thereof when the count of the counter 9 reaches "20".

When the exact opening time ratios corresponding to the film speeds of ISO 1000, 200 and 64 are calculated down to the fourth decimal place on the basis of the equation (3), the exact opening time ratio for the ISO 1000 is "4.8988", the exact opening time ratio for the ISO 200 is "11.3136" and the exact opening time ratio for the ISO 64 is "19.5952". The error of the approximate opening time ratio to the exact opening time ratio converted to the EV value falls within 0.1 EV and hence the approximate opening time ratio is practically sufficient in accuracy.

The outputs of the AND gates $G_3$ to $G_9$ corresponding to the film speeds of ISO 25 to 1600 are applied to the S input of the flip-flop $F_8$ through the OR gate $G_{10}$ to set the flip-flop $F_8$ and the rising edge of the output of the flip-flop $F_8$ triggers a well-known strobo unit 10.

Since the present embodiment is thus structured so that the trigger signal is applied to the strobo unit 10 when the count of the counter 9 reaches a value determined in accordance with the coded film speed, the opening time t of the shutter blades until the strobo unit is lighted can be fitted to the film speed.

There is the distance L to the subject in addition to the film speed as a variable for determining the opening time t until the strobo unit is lighted as shown in the equation (3).

Further, since the count up speed of the counter 9 is determined by the period T of the basic pulse $\phi$ applied to the flip-flop $F_2$, the period of the basic pulse $\phi$ is proportional to the distance L in the embodiment so that the opening time t until the flashlight illumination is fitted to the distance.

As shown by the equation (3), the opening time t until the strobo unit is lighted is proportional to the distance L.

In the present embodiment, the period T of the basic pulse $\phi$ applied to the first stage flip-flop $F_2$ of the counter 9 is proportional to the distance L so that the opening time t until the strobo unit is lighted is proportional to the distance L.

While various methods for proportionate the period T of the basic pulse $\phi$ to the distance L are considered, a current setting circuit 12 of FIG. 3 which produces a current corresponding to a resistance value of a resistor connected outside is connected to any one of resistors 11 in interlocked relationship with a position of a focus adjusting mechanism so that a current i which is inversely proportional to the distance L is obtained. The current i is applied to a pulse oscillator 13 which produces a pulse of which a period T is inversely proportional to an input current thereof. Consequently, the pulse oscillator 13 produces the basic pulse $\phi$ having the period T proportional to the distance L.

More particularly, in FIG. 3, numeral 14 denotes a brush for connecting the current setting circuit to any one of the resistors 11. The resistors 11 are associated with, for example, a distance ring, a helicoid of the photographing lens or part of lens group for a focus adjustment in the photographing lens group. Any one of resistors 11 is connected to the current setting circuit 12 through the brush 14 in accordance with the position of the focus adjusting mechanism and the current setting circuit 12 supplies the current i inversely proportional to the distance L to the pulse oscillator 13.

The pulse oscillator 13 charges and discharges the condenser 13a by the current i and generates the basic pulse having the period T which s inversely proportional to the current i and hence the basic pulse $\phi$ having the period T proportional to the distance L is obtained from the pulse oscillator 13.

In FIG. 3, numeral 6 denotes a trigger switch described in FIG. 1, G1 denotes an inverter gate, and 15 denotes a switching transistor which short-circuits and opens across the condenser 13a to operate and stop the pulse oscillator 13.

An S-R flip-flop $F_1$, and AND gate $G_2$ and a resistor 16 are to delay the operation of the counter 9 by a time corresponding to a so-called mechanical delay of the shutter opening and closing mechanism.

That is, the mechanical member for closing the shutter blades has a constant delay time in operation (this delay time is referred to as a closure delay time in this specification) and the shutter blades are closed after the lapse of the constant closure delay time after an automatic exposure control circuit not shown produces a shutter closure signal AE.

In the present embodiment, since the trigger switch 6 also triggers the automatic exposure control circuit, it is necessary to operate the trigger switch 6 at a time earlier than the time the actual shutter blades start its opening by a time corresponding to the closure delay time.

On the other hand, since the strobo unit is triggered through a thyristor as well known, it is not necessary to previously set the closure delay time for the strobo unit and if the closure delay time is previously set, the strobo unit is lighted before the aperture of the shutter reaches a desired aperture.

In the present embodiment, after the trigger switch 6 has been broken, current i determined by the resistor 16 is supplied to the pulse generator 13 from the current setting circuit 12 so that a pulse having the period of twice the closure delay time is generated. The rising edge of the pulse sets the flip-flop $F_1$ and the Q output of the flip-flop $F_1$ conducts the AND gate $G_2$ so that the flip-flop $F_2$ in the first stage of the counter 9 can be operated.

An adjustable resistor 12a of the current setting circuit 12 is to adjust a proportional factor of the distance L and the output current i.

Figure 6:
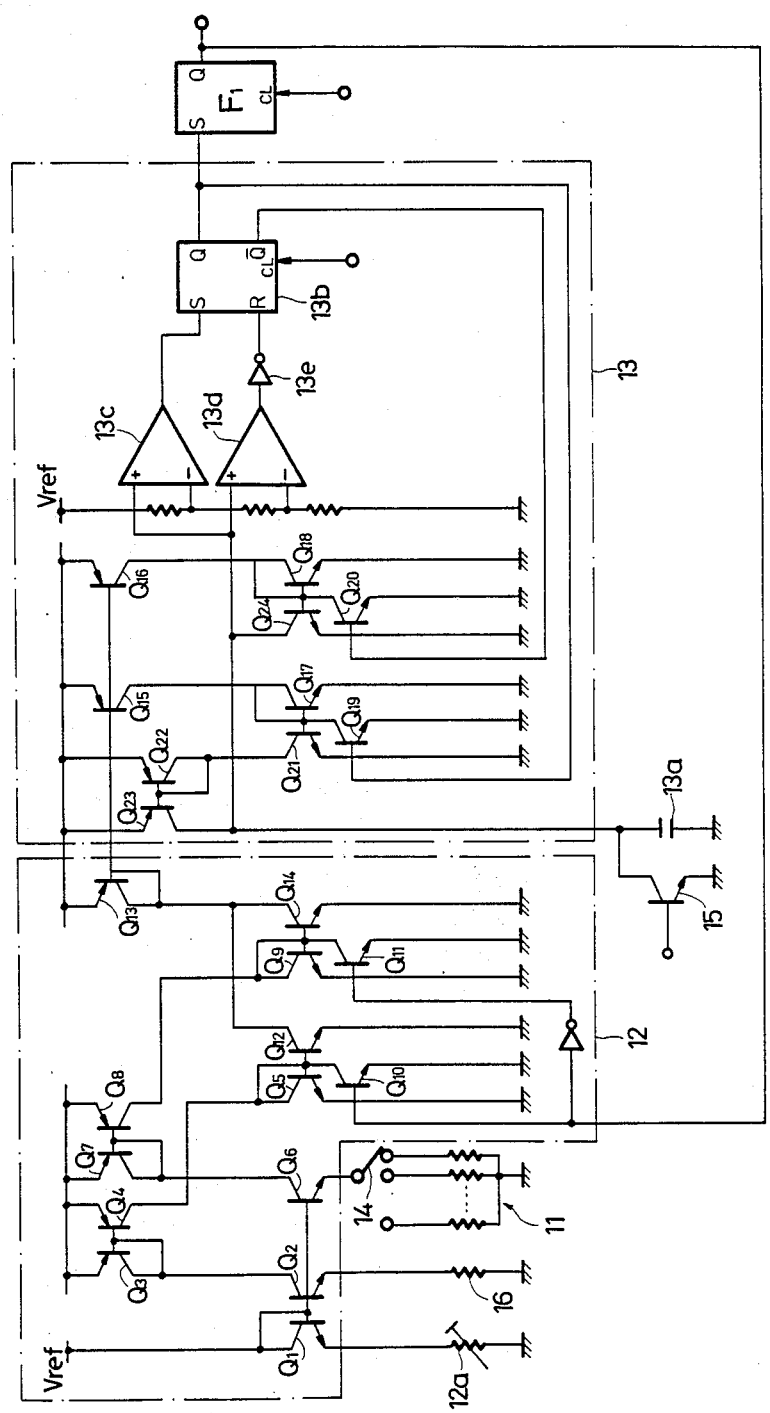
FIG. 6 is a circuit diagram showing an example of a current setting circuit, a pulse oscillator and a peripheral circuit thereof shown in FIG. 3.

FIG. 6 shows an example of the current setting circuit 12, the pulse oscillator 13 and the peripheral circuit thereof.

Basically, the current setting circuit 12 selects on the basis of a state of the flip-flop $F_1$ one of a constant-current circuit for setting the closure delay time and a constant-current source circuit for converting the pulse period and changes the characteristic of the constant-current circuit for converting the pulse period by the connection state of the brush 14.

More particularly, a constant current flow through a transistor $Q_1$ forming a diode and if a voltage between the base and emitter of the transistor $Q_1$ is equal to that of a transistor $Q_2$, a voltage across the resistor 12a is equal to a voltage across the resistor 16 and hence a current determined by a ratio of resistance values of the resistors 12a and 16 flows through the transistor $Q_2$.

Accordingly, currents flowing through transistors $Q_3$, $Q_4$ and $Q_5$ are also determined by the ratio of the resistance values of the resistors 12a and 16.

Similarly, if a voltage between the base and emitter of a transistor $Q_6$ is equal to that of the transistor $Q_1$, the voltage across the resistor 12a is equal to a voltage across a resistor of the resistors 11 connected with the brush 14 and hence a current determined by a ratio of resistance values of the resistor 12a and the resistor connected with the brush 14 flows through the transistor $Q_6$.

Accordingly, currents flowing through transistors $Q_7$, $Q_8$ and $Q_9$ are also determined by the ratio of the resistance values of the resistor 12a and the resistor connected with the brush 14.

On the other hand, when the flip-flop $F_1$ is reset, a transistor $Q_{10}$ is off and a transistor $Q_{11}$ is on. Accordingly, a current determined by the resistance ratio of the resistor 12a and 16 flows through transistors $Q_{12}$ and $Q_{13}$.

Further, when the flip-slop $F_1$ is set, the transistor $Q_{10}$ is on and the transistor $Q_{11}$ is off. Accordingly, a current determined by the resistance ratio of the resistor 12a and the resistor connected with the brush 14 flows through the transistors $Q_{14}$ and $Q_{13}$.

Transistors $Q_{15}$ and $Q_{16}$ have bases commonly connected to the base of the transistor $Q_{13}$. Accordingly, until the flip-flop $F_1$ is set, the current determined by the resistance value of the resistor 16 flows through the transistors $Q_{15}$ and $Q_{16}$ as a reference of the resistor 12a, while after the flip-flop $F_1$ is set the current determined by the resistance value of the resistor of the resistors 11 connected with the brush 14 flows through the transistors $Q_{15}$ and $Q_{16}$.

In the pulse oscillator 13, the cycle of changing and discharging the condenser 13a is controlled by a state of the flip-flop 13b and a changed level of the condenser 13a due to the charge and discharge is detected by comparators 13c and 13d. The comparators 13c and 13d control the set and reset the flip-flop 13b and the basic pulse $\phi$ is obtained from the Q output of the flip-flop 13b.

Namely, the current through the transistor $Q_{15}$ flows through a transistor $Q_{17}$ and the current through the transistor $Q_{16}$ flows through a transistor $Q_{18}$. Accordingly, until the flip-flop $F_1$ is set, the currents flowing through the transistors $Q_{17}$ and $Q_{18}$ are determined by the resistance value of the resistor 16, and after the flip-flop $F_1$ is set, the currents through the transistors $Q_{17}$ and $Q_{18}$ are determined by the resistance value of the resistor of the resistors 11 connected to the brush 14.

At the initial state, since the flip-flop 13b is reset, a transistor $Q_{19}$ is off and a transistor $Q_{20}$ is on. Hence, a current corresponding to the current through the transistor $Q_{17}$ flows through transistors $Q_{21}$, $Q_{22}$ and $Q_{23}$ and the condenser 13a is charged by the current flowing through the transistor $Q_{23}$.

When the voltage level of the condenser 13a reaches a level at an inverted input of the comparator 13c, the flip-flop 13b is set by an output of the comparator 13c and the transistor $Q_{19}$ is turned on while the transistor $Q_{20}$ is turned off. Consequently, a current corresponding to the current through the transistor $Q_{18}$ flows through a transistor $Q_{24}$ and the condenser 13a is discharged by the current flowing through the transistor $Q_{24}$.

When the voltage level of the condenser 13a is reduced to a level at inverted input of the comparator 13d, an output of the comparator 13d is inverted by an inverter 13e to reset the flip-flop 13b and the condenser 13a is charged again.

Thus, the flip-flop 13b is repeatedly set and reset and the basic pulse $\phi$ is obtained from the Q output of the flip-flop 13b.

At this time, since the charging and discharging time of the condenser 13a is inversely proportional to the magnitude of the charging and discharging current, the period T of the basic pulse $\phi$ is determined by the resistance value of the resistor 16 before the flip-flop $F_1$ is set, while the period T is determined by the resistance value of the resistor of the resistors 11 connected to the brush 14 after the flip-flop $F_1$ is set.

Accordingly, if the resistance value of the resistors 11 is set so that the current flowing through the transistors $Q_{15}$ and $Q_{16}$ is inversely proportional to the distance L to the subject being photographed, the basic pulse $\phi$ having a period T proportional to the distance L can be obtained.

Operation of the present embodiments is now described with reference to the foregoing.

First of all, a clear signal CL is produced in interlocked relationship with operation of a main switch not shown (the main switch is operated by, for example, a half-stroke of a shutter button) and the clear signal clears all the flip-flops.

The current setting circuit 12 supplies the current i determined in accordance with the resistance value of the resistor 16 to the transistors $Q_{15}$ and $Q_{16}$ of the pulse oscillator 13. However, at this time, since the trigger switch 6 is closed and the transistor 15 is on, the condenser 13a is short-circuited to ground and the pulse oscillator 13 does not oscillate.

On the other hand, the film speed input circuit 7 reads the CAS code formed on a predetermined position of the film cartridge loaded into a camera and supplies the coded film speed information to the decoder 8.

The decoder 8 decodes the film speed information and selects one of the AND gates $G_3$ to $G_9$ on the basis of the decoded information, thereby applying a high level signal to one input of the selected AND gate.

More particularly, the decoder 8 selects the AND gate $G_3$ if the loaded film speed is ISO 1600, the AND gate $G_4$ if ISO 1000, the AND gate $G_5$ if ISO 400, the AND gate $G_6$ if ISO 200, the AND gate $G_7$ if ISO 100, and the AND gate $G_8$ if ISO 64 and the AND gate $G_9$ if ISO 25, and applies the high level to one input thereof.

In this condition, when the shutter button is operated to its full-stroke, the lever 4 for opening and closing the shutter blades of FIG. 1 is released and starts to rotate counter-clockwise by the spring 5. Consequently, the shutter blade 2 is rotated counter-clockwise about the axis 1a through the boss 4a and the shutter blade 3 is rotated clockwise about the axis 1a through the boss 4b. Accordingly, the aperture 1e is opened by the shutter blades 2 and 3 with the opening characteristic as shown in FIG. 2.

In the process of opening the aperture 1e as described above, the lever 4 separates from the trigger switch 6 at time "−D" shown in FIG. 5 and hence the trigger switch 6 opens to cut off the transistor 15. Thus, the condenser 13a can be charged.

At this time, the flip-flops $F_1$ and 13b are in the initially cleared state.

When the flip-flop $F_1$ is in the cleared state, the current setting circuit 12 includes the transistor $Q_{10}$ being off and the transistor $Q_{11}$ being on. Accordingly, the current determined by the resistance value of the resistor 16 flows through the transistor $Q_{13}$ irrespective of the distance L and also flows through the transistors $Q_{15}$ and $Q_{16}$ of the pulse oscillator 13.

Further, when the flip-flop 13b is in the cleared state, the pulse oscillator 13 includes the transistor $Q_{19}$ being off and the transistor $Q_{20}$ being on. Accordingly, the current corresponding to the current through the transistor $Q_{15}$ (that is, the current determined by the resistance value of the resistor 16) flows through the transistors $Q_{21}$, $Q_{22}$ and $Q_{23}$ and the condenser 13a is charged by the current flowing through the transistor $Q_{23}$.

At time "0" of FIG. 5, when the charged level of the condenser 13a reaches the level at the inverted input of the comparator 13c, the comparator 13c produces an output to set the flip-flop 13b.

Since the Q output of the flip-flop 13b forms the basic pulse $\phi$, the first rising edge of the basic pulse $\phi$ produced from the pulse oscillator 13 is produced at the time "0".

The period of time between the time "−D" and the time "0" of FIG. 5 corresponds to the closure delay time of mechanical member upon closure of the shutter blades described above.

When the Q output of the flip-flop 13b rises up, the flip-flop $F_1$ is set and the AND gate $G_2$ is opened.

When the flip-flop $F_1$ is set, the transistor $Q_{10}$ of the current setting circuit 12 is turned on and the transistor $Q_{11}$ is turned off. The current determined by the resistance value of the resistor of the resistors 11 connected with the brush 14 in interlocked relationship with the distance L flows through the transistor $Q_{13}$. Accordingly, the current determined by the resistance value of the resistor of the resistors 11 connected with the brush 14 in interlocked relationship with the distance L also flows through the transistors $Q_{15}$ and $Q_{16}$ of the pulse oscillator 13.

When the flip-flop 13b is set, the transistor $Q_{20}$ is off and the current corresponding to the current through the transistor $Q_{16}$ flows through the transistor $Q_{24}$. The condenser 13a is discharged by the current flowing through the transistor $Q_{24}$. When the charged level of the condenser 13a is reduced to the level at the inverted input of the comparator 13d, the output of the comparator 13d is inverted by the inverter 13e to reset the flip-flop 13b and the condenser 13a is charged again.

Thereafter, the condenser 13a is charged and discharged repeatedly and the flip-flop 13b is also set and reset repeatedly so that the basic pulse $\phi$ is generated from the flip-flop 13b.

The charging and discharging time of the condenser 13a is inversely proportional to the charging and discharging current of the condenser 13a which is determined by the resistance value of the resistor of the resistors 11 connected with the brush 14. Accordingly, if the resistance values of the resistors 11 are determined so that the charging and discharging current of the condenser 13a is inversely proportional to the distance L, the charging and discharging time of the condenser 13a (that is, the period T of the basic pulse $\phi$) can be proportional to the distance L.

The basic pulse $\phi$ produced from the pulse oscillator 13 is applied to the clock input of the flip-flop $F_2$ and is counted by the six-stage counter 9 composed of the flip-flops $F_2$ to $F_7$. Since the counting speed of the counter 9 is determined by the period T of the basic pulse $\phi$, the counting speed of the counter 9 is proportional to the distance L.

The count output of the counter 9 is applied to the AND gates $G_3$ to $G_9$. The output of AND gate $G_3$ is high when the count of the counter 9 reaches 4 for the loaded film speed of ISO 1600, output of AND gate $G_4$ is high when count reaches 5 for ISO 1000, output of AND gate $G_5$ is high when the count reaches 8 for ISO 400, output of AND gate $G_6$ is high when count is 11 for ISO 200, output of AND gate $G_7$ is high when count is 16 for ISO 100, output of AND gate $G_8$ is high when count is 20 for ISO 64, and output of AND gate $G_9$ is high when count is 32 for ISO 25.

Any one of outputs of the AND gates $G_3$ to $G_9$ is applied to the S input of the flip-flop $F_8$ through the OR gate $G_{10}$ and sets the flip-flop $F_8$. The strobo unit 10 is triggered by the Q output of the flip-flop $F_8$ and lighted.

A signal AE applied to the OR gate $G_{10}$ is the shutter closure signal which is produced when an automatic exposure circuit not shown detects a proper exposure. When a proper exposure is obtained before the output of the AND gates $G_3$ to $G_9$ is high, the strobo unit is triggered by the shutter closure signal AE. Accordingly, even when the shutter is closed before the count of the counter 9 reaches a value determined in accordance with the film speed, the strobo unit 10 is lighted at the closure time of the shutter.

As described above, in the present embodiment, when the basic pulse $\phi$ having the period T proportional to the distance L is counted by the counter 9 and the count of the counter 9 reaches a value corresponding to the film speed, the strobo unit 10 is lighted. Accordingly, the strobo unit is always lighted at a time a proper F number is obtained.

In the above embodiment, although the strobo unit is lighted when a combination of the output of the decoder 8 and the output of the counter 9 is a previously established value, since the decoder 8, the AND gate $G_3$ to $G_9$ and the counter 9 serve as a preset counter as a whole, a general preset counter can be used to set its preset value by a coded film speed and proportionate the period L of the basic pulse for operating the preset counter to the distance L.

Further, in the above embodiment, while the constant-current type pulse oscillator 13 is adjusted to generate the basic pulse $\phi$ having the period T which is inversely proportional to the input current i thereof and the output current of the current setting circuit 12 which varies depending on the resistance value of the resistor of the resistors 11 connected with the brush 14 in interlocked relationship with the focus adjusting mechanism is supplied to the pulse oscillator 13 with the resistance value of each of the resistors 11 being adjusted so that the output current i of the current setting circuit 12 is inversely proportional to the distance L, the circuit configuration is not limited thereto as far as the basic pulse having the period proportional to the distance can be obtained.

Figure 7:
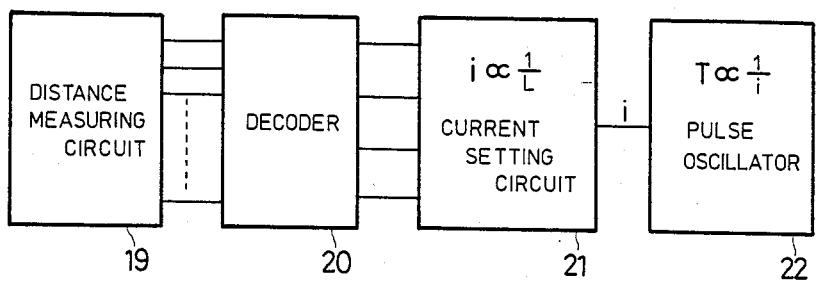
FIG. 7 is a block diagram showing another embodiment of the present invention.

FIG. 7 shows an example in which the distance L is inputted digitally. When there is provided a distance measuring circuit 19 employing, for example, an infrared sensor, the distance information is digitally inputted from the distance measuring circuit 19 as an output pattern of a light receiving array.

The output of the distance measuring circuit 19 is decoded by a decoder 20 to be applied to a current setting circuit 21.

Figure 8:
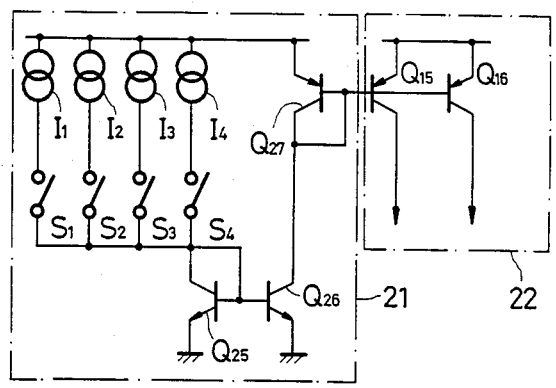
FIG. 8 is a circuit diagram showing an example of a current setting shown in FIG. 7.

FIG. 8 shows an example of an actual circuit configuration of the current setting circuit 21, in which electronic switches $S_1$ to $S_4$ are operated by the output of the decoder 20 to determine an operation pattern of current sources $I_1$ to $I_4$.

Current values of the current sources $I_1$ to $I_4$ are summed in a diode $Q_{25}$ and a current which is inversely proportional to the distance flows through transistors $Q_{26}$ and $Q_{27}$.

A pulse oscillator 22 is configured in the same manner as the pulse oscillator 13 described in detail in FIG. 6. The current inversely proportional to the distance flows through the transistors $Q_{15}$ and $Q_{16}$ having the bases connected commonly with the base of the transistor $Q_{27}$ and the basic pulse having the period proportional to the distance is obtained.

In the circuit of FIG. 8, a current can be supplied from the current setting circuit 21 to the pulse oscillator 22 until the pulse oscillator 22 generates a first pulse so that a period required for rising of the first pulse corresponds to the closure delay time of the shutter blades.

Figure 9:
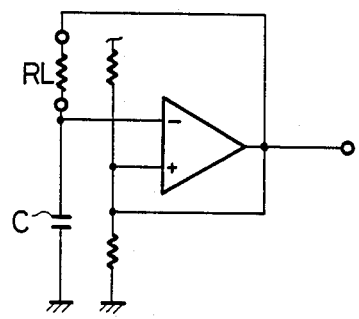
FIG. 9 is a circuit diagram showing another embodiment of the present invention.

FIG. 9 shows an example in which a pulse oscillator having a period determined by a CR time constant is employed. A resistor RL forming one element for determining the time constant is structured by a slidable variable resistor provided in a focus adjusting mechanism such as a helicoid. The time constant is determined by a position of the focus adjusting mechanism and the basic pulse $\phi$ having the period T proportional to the distance L is obtained.

The embodiments are described for the shutter blades having the opening characteristic as shown in FIG. 2. When the opening characteristic is changed, it is needless to say that the equations of the premise are changed. Even if the opening characteristic of the shutter blades is varied, the variation rate of the period of the basic pulse due to change of the distance and the set value of the counter due to change of the film speed can be adjusted in accordance with the opening characteristic so that the present invention is applicable thereto.

In the embodiments, although the film speed is inputted as the CAS code, the present invention is applicable without use of the CAS code as far as the film speed is inputted digitally. The present invention can be applied to the case where a film speed counter is renewed by a push-button switch.

As described above, according to the present invention, since the basic pulse having the period proportional to the distance is counted by the counter and when the count of the counter reaches a value determined in accordance with the film speed the strobo unit is lighted, the strobo unit can be always lighted at the time when a proper F number is obtained.

Further, according to the present invention, since a digital-to-analog conversion requiring a wide dynamic range for determination of the timing of the flashlight illumination is not necessary, the input precision of the distance is depending on the precision of the focus adjusting mechanism and the dynamic range of the focus adjusting mechanism is less than ten times, error in the distance-to-time conversion is greatly reduced and the exposure control in the photographing operaton using the strobo unit can be attained with high accuracy.

According to the present invention, since it is not necessary to add a mechanism for limiting the operating range of the shutter mechanism, complexity of the shutter mechanism can be avoided.

Furthermore, according to the present invention, the trigger switch for the automatic exposure control can be employed to adjust the closure delay time simply.

I claim:

1. A strobo control circuit in which a trigger pulse for flashlight illumination is applied to a strobo unit at a time when an aperture of shutter blades having a function of a diaphragm which aperture is increased with the lapse of an exposure time is a proper value determined in accordance with the amount of illumination of the strobo unit, a distance to a subject being photographed and a film speed, comprising:
   means for generating a basic pulse having a period determined in accordance with the distance;
   a counter which starts counting operation thereof by said basic pulse in interlocked relationship with opening operation of said shutter blades;
   a film speed input circuit for inputting the film speed in the form of a digital code;
   trigger signal generating means for applying the trigger signal to the strobo unit at a time when said counter counts said basic pulse by the number of times corresponding to said digitally inputted film speed.

2. A strobo control circuit according to claim 1, wherein said basic pulse generating means comprises:
   a pulse oscillator which generates the basic pulse each time a cycle for charging and discharging a condenser is changed and in which the cycle is inversely proportional to an input current; and
   a current setting circuit for applying to said pulse oscillator an current which is inversely proportional to a resistance value of a resistor of resistors selected in interlocked relationship with a focus adjusting mechanism.

3. A strobo control circuit according to claim 1, wherein said basic pulse generating means comprises:
   a pulse oscillator which generates the basic pulse when a cycle for charging and discharging a condenser is changed and in which the cycle is inversely proprotional to an input current;
   a current setting circuit in which currents of a plurality of constant current sources are summed to apply the sum to said pulse oscillator;
   a distance measuring circuit for producing the distance in the form of a digital signal; and
   a decoder for decoding an output of said distance measuring circuit to determine an operation pattern of the plurality of constant current source of said current setting circuit.

4. A strobo control circuit according to claim 2 comprising timer means in which a time corresponding to a closure delay time of said shutter blades is set and wherein said counter is operated after the lapse of the set time of said timer means after start of the opening operation of said shutter blades.

5. A strobo control circuit according to claim 4, wherein said timer means comprises:
   a memory circuit which memorizes generation of a first pulse by said pulse oscillator;
   a constant current source which supplies to said pulse oscillator a current so that a time requiring the generation of the first pulse by said pulse oscillator corresponds to the closure delay time of said shutter blades; and
   a switching circuit for supplying an output current of said constant current source to said pulse oscillator until said memory circuit memorizes the generation of the first pulse by said pulse oscillator and for supplying the current inversely proportional to the distance and produced by said current setting circuit to said pulse oscillator after said memory circuit memorizes the generation of the first pulse by said pulse oscillator;
   whereby said counter is operated after said memory circuit memorizes the generation of the first pulse by said pulse oscillator.

6. A strobo control circuit according to claim 3, comprising timer means in which a time corresponding to a closure delay time of said shutter blades is set and wherein said counter is operated after the lapse of the set time of said timer means after start of the opening operation of said shutter blades.

7. A strobo control circuit according to claim 6, wherein said timer means comprises:
   a memory circuit which memorizes generation of a first pulse by said pulse oscillator;
   a constant current source which supplies to said pulse oscillator a current so that a time requiring the generation of the first pulse by said pulse oscillator corresponds to the closure delay time of said shutter blades; and
   a switching circuit for supplying an output current of said constant current source to said pulse oscillator unil said memory circuit memorizes the generation of the first pulse by said pulse oscillator and for supplying the current inversely proportional to the distance and produced by said current setting circuit to said pulse oscillator after said memory circuit memorizes the generation of the first pulse by said pulse oscillator;
   whereby said counter is operated after said memory circuit memorizes the generation of the first pulse by said pulse oscillator.

* * * * *